United States Patent
Gomes (10) Patent No.: US 10,372,526 B2
(45) Date of Patent: Aug. 6, 2019

(54) CLEANUP OF UNPREDICTABLE TEST RESULTS

(71) Applicant: International Business Machines Corporation, Armonk, NY (US)

(72) Inventor: Louis P. Gomes, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 75 days.

(21) Appl. No.: 15/649,834

(22) Filed: Jul. 14, 2017

(65) Prior Publication Data

US 2019/0018726 A1  Jan. 17, 2019

(51) Int. Cl.
| | | |
|---|---|---|
| *G06F 11/00* | (2006.01) | |
| *G06F 11/07* | (2006.01) | |
| *G06F 11/36* | (2006.01) | |
| *G06F 11/22* | (2006.01) | |

(52) U.S. Cl.
CPC ........ *G06F 11/0793* (2013.01); *G06F 11/004* (2013.01); *G06F 11/22* (2013.01); *G06F 11/3684* (2013.01); *G06F 11/3688* (2013.01); *G06F 11/0718* (2013.01); *G06F 11/0754* (2013.01)

(58) Field of Classification Search
None
See application file for complete search history.

(56) References Cited

U.S. PATENT DOCUMENTS

| | | | |
|---|---|---|---|
| 4,189,772 A * | 2/1980 | Liptay | G06F 9/30018 711/E12.051 |
| 6,865,706 B1 | 3/2005 | Rohrbaugh et al. | |
| 7,644,399 B2 * | 1/2010 | Craske | G06F 9/455 717/135 |
| 7,647,219 B2 | 1/2010 | Overturf et al. | |
| 8,838,651 B2 | 9/2014 | Kang et al. | |

(Continued)

OTHER PUBLICATIONS

Gomes, Louis P., "Cleanup of Unpredictable Test Results", U.S. Appl. No. 15/803,317, filed Nov. 3, 2017.

(Continued)

*Primary Examiner* — Daniel F. McMahon
(74) *Attorney, Agent, or Firm* — Christopher K. McLane; Alexander G. Jochym (57) ABSTRACT

In an approach to cleanup of unpredictable test results, one or more computer processors generate a data area associated with a first test instruction in a test stream. The one or more computer processors determine whether the generated data area overlaps with an unpredictable data area. In response to determining the generated data area overlaps with an unpredictable data area, the one or more computer processors determine a second test instruction associated with the overlapped unpredictable data area, where the second test instruction precedes the first test instruction in the test stream. The one or more computer processors select a location in the test stream between the first test instruction and the second test instruction. The one or more computer processors insert one or more pre-requisite instructions in the selected location, where the one or more pre-requisite instructions load the overlapped unpredictable data area with pre-defined data.

13 Claims, 4 Drawing Sheets

(56) References Cited

U.S. PATENT DOCUMENTS

2003/0130813 A1* 7/2003 Adir .................. G06F 11/263
                                                          702/119
2003/0130831 A1   7/2003  Adir
2006/0271824 A1  11/2006  Kwong et al.
2007/0006037 A1   1/2007  Sargusingh et al.
2012/0102302 A1*  4/2012  Bansal ................ G06F 9/3804
                                                          712/234
2013/0198567 A1   8/2013  Ahmed et al.
2014/0068325 A1   3/2014  Masser et al.
2014/0304556 A1  10/2014  Alexander et al.

OTHER PUBLICATIONS

List of IBM Patents or Patent Applications Treated as Related. Filed Nov. 3, 2017. 2 pages.
U.S. Appl. No. 15/857,036, filed Dec. 28, 2017.
List of IBM Patents or Patent Applications Treated as Related. Filed Herewith. 2 pages.

* cited by examiner

CLEANUP OF UNPREDICTABLE TEST RESULTS

BACKGROUND OF THE INVENTION

The present invention relates generally to the field of test management, and more particularly to random insertion of pre-requisite instructions for cleanup of unpredictable test results.

System testing checks whether the system under test operates as intended or not. When the system under test does not operate as intended, yielding unexpected results, this is due to defects in the system or the software of the system. The correction of these defects, and the introduction of new features or the enhancement of existing features, may introduce new defects into the system under test. Repeated testing improves the likelihood of catching defects soon after their introduction.

In general, there are two testing approaches with mutually exclusive advantages, namely, manual testing and automated testing. The strength of manual testing, especially in complex software environments, is that the software is used from the point of view of the customer and with a customer-like behavior, thereby executing an arbitrary sequence of activities and inputs. Due to manual testing, the state of the system under test is non-deterministic, e.g., due to user errors. Thus, the system under test might get into a system state that has not yet been considered. Automated testing shows other advantages. Automated testing is less resource intensive than manual testing because no human test person is needed. In addition, occurring failures are deterministically reproducible because of the well-defined run of the test routine. Finally, automated testing is much faster, i.e., a higher coverage of testing is reached in a certain period of time.

Known solutions and tools essentially are focused on automated test execution which provide the advantages of automated testing as described above but do negate the benefits of manual test execution. Hence, once manual test scenarios get automated, most of the mentioned advantages of manual testing are lost because the user-specific randomness is eliminated by using a deterministic test environment. In addition, most automated tests do not focus on long-term effects and do not reflect stochastic, i.e., random, aspects of human user activities.

SUMMARY

Embodiments of the present invention disclose a method, a computer program product, and a system for cleanup of unpredictable test results. The method may include one or more computer processors generating a data area associated with a first test instruction in a test stream. The one or more computer processors determine whether the generated data area overlaps with an unpredictable data area. In response to determining the generated data area overlaps with an unpredictable data area, the one or more computer processors determine a second test instruction associated with the overlapped unpredictable data area, where the second test instruction precedes the first test instruction in the test stream. The one or more computer processors select a location in the test stream between the first test instruction and the second test instruction. The one or more computer processors insert one or more pre-requisite instructions in the selected location, where the one or more pre-requisite instructions load the overlapped unpredictable data area with pre-defined data.

DETAILED DESCRIPTION

During system level testing, some test instructions may generate unpredictable data, i.e., the results are random, for example, noise data, and a system architect does not know what content the test instruction will create during processing. In other words, some test instructions may produce dynamically changing data. In a random system test stream, i.e., collection of test instructions, some test instructions are simple and do not require pre-requisite instructions to set up operands with specific values or post-requisite instructions for cleanup of any unpredictable results after execution of the instruction, where the cleanup may include overwriting unpredictable data with known, pre-defined data.

For more complex instructions, post-requisite cleanup instructions for unpredictable results may be needed to prevent a subsequent instruction from getting an unpredictable answer when the test stream is re-executed using the same initial setup or when another test instruction within the test stream uses previously generated unpredictable data. Thus, in general, post-requisite cleanup instructions may be inserted after every instance where a test instruction generates unpredictable results. However, if the unpredictable results are not used by a subsequent test instruction, inserting post-requisite cleanup instructions may not be necessary for error prevention or error reproduction.

Additionally, inserting post-requisite instructions after every test instruction that generates unpredictable results may create additional overhead, due to additional processing time, as well as generating a test instruction post-requisite pattern, which may render the test stream less random than is preferred. Also, the size of a test stream may be limited, therefore inserting post-requisite instructions after every test instruction that generates unpredictable results may limit the number of test instructions in the test stream and reduce the test coverage.

Embodiments of the present invention recognize that processing efficiency may be gained by inserting pre-requisite instructions at a random position for cleanup of only the portion of the unpredictable results that are used by a subsequent test instruction, thus minimizing the use of post-requisite instructions. Embodiments of the present invention enable a more random test stream which includes more test instructions and provides better test coverage. Implementation of embodiments of the invention may take a variety of forms, and exemplary implementation details are discussed subsequently with reference to the Figures.

Figure 1:
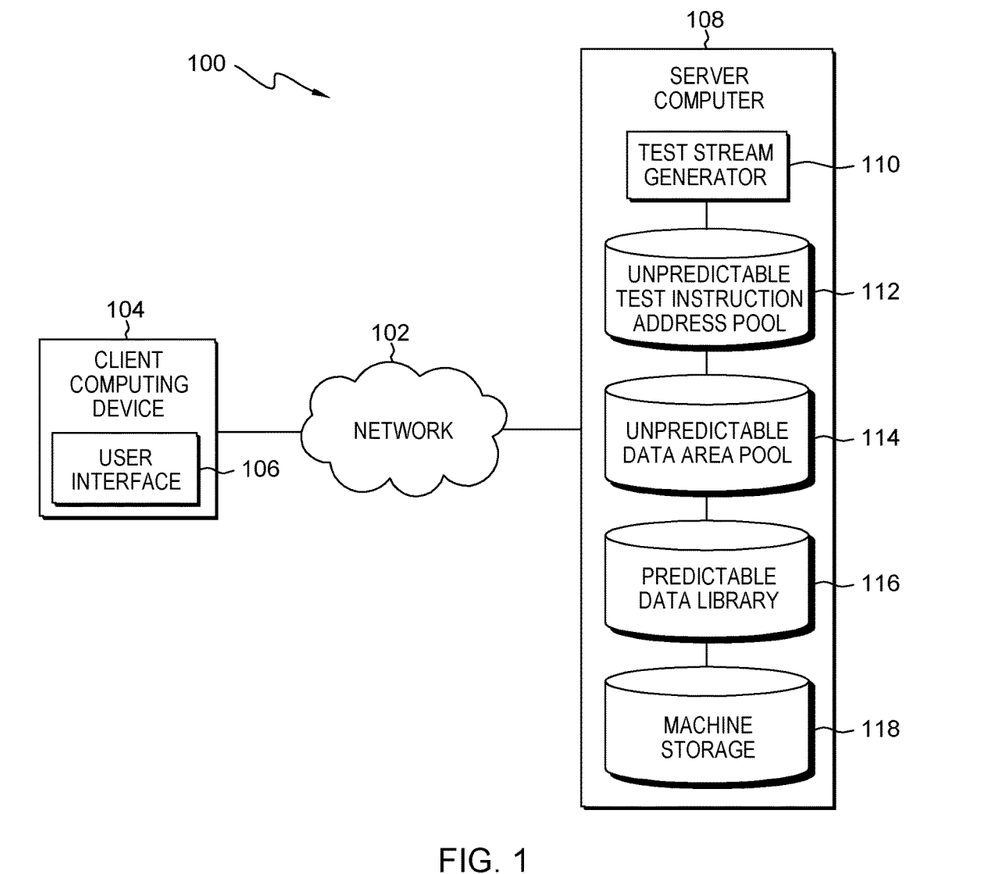
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 includes user interface 106.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to run system tests of server computer 108 and receive results of the testing.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes test stream generator 110, unpredictable test instruction address pool 112, unpredictable data area pool 114, predictable data library 116, and machine storage 118. Server computer 108 may include internal and external hardware components, as depicted and described in further detail with respect to FIG. 4.

Test stream generator 110 creates an efficient and random test stream by inserting pre-requisite test instructions at random locations in the stream to clean up unpredictable data created by a test instruction where the unpredictable data may be re-used by a subsequent test instruction in the test stream. Test stream generator 110 initializes unpredictable test instruction address pool 112, unpredictable data area pool 114, and predictable data library 116 and builds one test instruction at a time. Test stream generator 110 stores the address of a test instruction that generates unpredictable data and the address and length of each unpredictable data area of the test instruction. If a current test instruction selects one or more unpredictable data areas, generated by a test instruction that precedes the current test instruction in the test stream, for an input area of the current test instruction, then test stream generator 110 determines the last test instruction with unpredictable data areas that overlap the input data areas of the current test instruction (i.e., overlapped unpredictable data areas) and inserts a pre-requisite instruction at a random offset, somewhere between the current test instruction and the last test instruction that generated the overlapped unpredictable data areas. The pre-requisite instruction copies pre-defined, and therefore predictable, data into the unpredictable data area, such that the current test instruction uses the predictable data. In the depicted embodiment, test stream generator 110 is a standalone program. In another embodiment, test stream generator 110 may be integrated within the operating system of server computer 108 or within any other program. Test stream generator 110 is depicted and described in further detail with respect to FIG. 2 and FIG. 3.

Unpredictable test instruction address pool 112, unpredictable data area pool 114, predictable data library 116, and machine storage 118 are each a repository for data used by test stream generator 110. In the depicted embodiment, unpredictable test instruction address pool 112, unpredictable data area pool 114, predictable data library 116, and machine storage 118 reside on server computer 108. In another embodiment, unpredictable test instruction address pool 112, unpredictable data area pool 114, predictable data library 116, and machine storage 118 may each reside elsewhere within distributed data processing environment 100 provided test stream generator 110 has access to unpredictable test instruction address pool 112, unpredictable data area pool 114, predictable data library 116, and machine storage 118. Unpredictable test instruction address pool 112, unpredictable data area pool 114, predictable data library 116, and machine storage 118 may each be a database, i.e., an organized collection of data. Unpredictable test instruction address pool 112, unpredictable data area pool 114, predictable data library 116, and machine storage 118 can each be implemented with any type of storage device capable of storing data and configuration files that can be accessed and utilized by server computer 108, such as a database server, a hard disk drive, or a flash memory. Unpredictable test instruction address pool 112 stores an address of any test instruction that may generate unpredictable data. Unpredictable data area pool 114 stores the start address of unpredictable data generated by a test instruction as well as the length of the data, i.e., the amount of storage space taken up by the unpredictable data. Predictable data library 116 stores pre-defined, predictable data created by either system architects, a test program, or test stream generator 110, for use by test stream generator 110. In one embodiment, predictable data library 116 is a read-only database repository. Machine storage 118 stores data generated by one or more test instructions in one or more test streams. Machine storage 118 may include one or more predictable data areas, one or more unpredictable data areas, or both.

Figure 2:
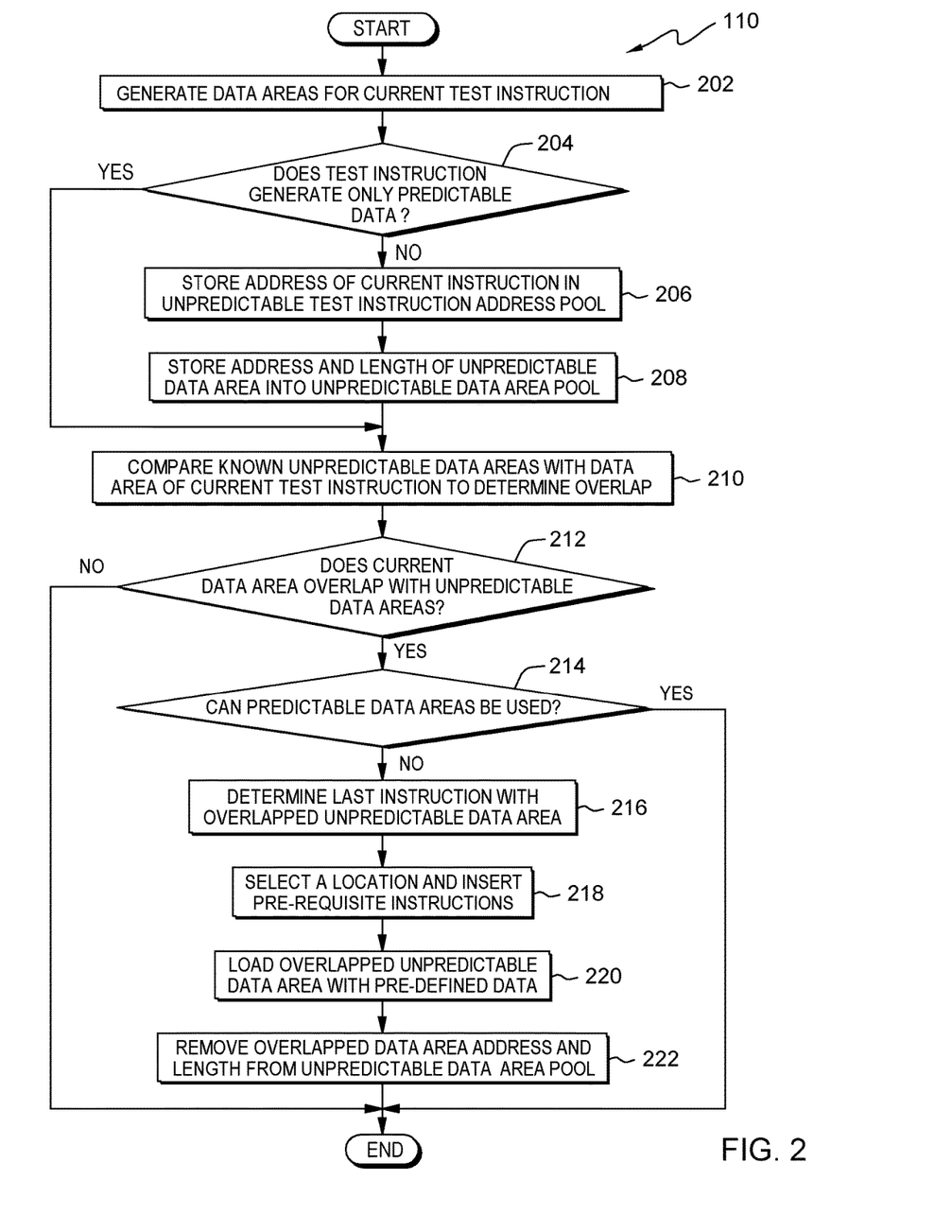
FIG. 2 is a flowchart depicting operational steps of a test stream generator, on a server computer within the distributed data processing environment of FIG. 1, for test instruction cleanup, in accordance with an embodiment of the present invention.

FIG. 2 is a flowchart depicting operational steps of test stream generator 110, on server computer 108 within distributed data processing environment 100 of FIG. 1, for test instruction cleanup, in accordance with an embodiment of the present invention.

Test stream generator 110 generates data areas for a current test instruction (step 202). For purposes of the present discussion, test stream generator 110 is referred to as generating a single data area, however, as a person of skill in the art would recognize, in various embodiments, test stream generator 110 may generate one or more data areas for a particular test instruction. As referred to herein, a data area represents a location in machine storage 118 where data generated by or used by a test instruction is located. In various embodiments, a data area may also reside in any register associated with server computer 108. Test stream generator 110 initializes unpredictable test instruction address pool 112, unpredictable data area pool 114, and predictable data library 116, and builds one test instruction at a time. Predictable data library 116 contains pre-defined pseudo-random data for usage by the current test stream, so test stream generator 110 initializes predictable data library 116 with new pseudo-random data before generating the first instruction in the test stream. Initializing predictable data library 116 per test stream with pseudo-random data keeps the data random yet predictable. Test stream generator 110 generates a random data area for each test instruction in machine storage 118.

Test stream generator 110 determines whether the current test instruction generates only predictable data (decision block 204). In some cases, the results that a test instruction generates when executed are predictable, where in other cases, it is known in advance that the test instruction will generate unpredictable results. Test stream generator 110 determines whether the data area associated with the current test instruction is predictable, unpredictable or both.

If test stream generator 110 determines the current test instruction does not include a predictable data area ("no" branch, decision block 204), then test stream generator 110 stores an address of the current test instruction into unpredictable test instruction address pool 112 (step 206). Test stream generator 110 keeps track of the address of test instructions that generate unpredictable results for searching purposes by storing the address in unpredictable test instruction address pool 112.

Test stream generator 110 stores the start address and length of the unpredictable data area into unpredictable data area pool 114 (step 208). Test stream generator 110 keeps track of the address and length of the unpredictable data area associated with the current test instruction for reference when performing a cleanup operation, as will be discussed below, by storing the address and length in unpredictable data area pool 114.

Test stream generator 110 compares known unpredictable data areas with the data area of the current test instruction to determine any overlap (step 210). After storing the start address and length of the unpredictable data area in unpredictable data area pool 114 and an address of the current test instruction in unpredictable test instruction address pool 112, or responsive to determining the current test instruction generates a predictable data area ("yes" branch, decision block 204), test stream generator 110 compares the list of known unpredictable data areas, i.e., area start address and length, stored in unpredictable data area pool 114 with the data area of the current test instruction to determine if there is any overlap of the data areas.

Test stream generator 110 determines whether the data area of the current test instruction overlaps with known unpredictable data areas (decision block 212). If test stream generator 110 determines the data area of the current test instruction does not overlap with known unpredictable data areas ("no" branch, decision block 212), then test instruction processing ends. If there is no overlap between the data area associated with the current test instruction and the known unpredictable data areas, then the current test instruction will not use an unpredictable data area, and therefore no additional pre-requisite instructions are needed.

If test stream generator 110 determines the data area of the current test instruction overlaps with known unpredictable data areas ("yes" branch, decision block 212), then test stream generator 110 determines whether predictable data areas can be used (decision block 214). For some test instructions, data residing in predictable data library 116 or in other data areas containing predictable data may be applicable. Test stream generator 110 determines whether building one or more data areas for the operands of the current test instruction can be performed using one or more predictable data areas.

If test stream generator 110 determines predictable data areas can be used ("yes" branch, decision block 214), then test instruction processing ends. In one embodiment, if the current test instruction uses both predictable and unpredictable data areas, then test stream generator 110 may determine that a predictable data area alone may not be adequate, and therefore test stream generator 110 uses the overlapped unpredictable data area.

If test stream generator 110 determines predictable data areas cannot be used ("no" branch, decision block 214), then test stream generator 110 determines the last test instruction with an overlapped unpredictable data area (step 216). In one embodiment, test stream generator 110 performs a backward search in unpredictable data area pool 114 to find the last, i.e., most recent in time, test instruction that stored the overlapped unpredictable data. A backward search in unpredictable data area pool 114 will yield the address of the unpredictable data area which indicates the corresponding test instruction address in unpredictable test instruction address pool 112 since unpredictable data area pool 114 and unpredictable test instruction address pool 112 have the same indices. A backward search may be more efficient than a forward search, where a forward search begins with the first test instruction in the test stream, because a backward search begins with the current test instruction and ends with the first found test instruction (i.e., the most recent test instruction) that contains the overlapped unpredictable data area, and therefore requires less code or logic and no record keeping. The gain in efficiency is especially true in a test stream where multiple test instructions stored data in the overlapped unpredictable data area since the backward search stops as soon as it finds the test instruction that most recently stored the overlapped unpredictable data. The backward search is described in further detail with respect to FIG. 3A and FIG. 3B.

Test stream generator 110 selects a location and inserts pre-requisite test instructions (step 218). Responsive to determining the last test instruction with an overlapped unpredictable data area, test stream generator 110 selects a random location in the test stream in which to insert pre-requisite instructions. The random location is at a point in the test stream between the current test instruction and the last test instruction with the overlapped unpredictable data area. In an embodiment, test stream generator 110 searches unpredictable test instruction address pool 112 to find the test instruction address of the test instruction associated with the overlapped unpredictable data area, and uses the address as a starting point to find the insertion point of the pre-requisite instructions. Test stream generator 110 inserts the pre-requisite instructions in the selected location in the test stream. The pre-requisite instructions clean up the overlapped unpredictable data area indicated by the start address and length.

Test stream generator 110 loads the overlapped unpredictable data area with pre-defined data (step 220). Using the inserted pre-requisite instructions, test stream generator 110 performs a cleanup operation by copying pre-defined data from predictable data library 116 into the overlapped unpredictable data area and overwriting the unpredictable data with the copied, pre-defined data. The cleanup operation converts the overlapped unpredictable data area into a predictable data area again since, after test stream generator 110 performs the cleanup operation, the overlapped unpredictable data area contains predictable data. In one embodiment, test stream generator 110 performs the cleanup on only the portion of the unpredictable data area used by the current test instruction. In another embodiment, test stream generator 110 performs the cleanup on the full unpredictable data area.

Test stream generator 110 removes the overlapped data area start address and length from unpredictable data area pool 114 (step 222). Since the overlapped data area no longer contains unpredictable data, test stream generator 110 can remove the data area start address and length from unpredictable data area pool 114, thus reclaiming the overlapped data area, and enabling test stream generator 110 to reuse the overlapped data area until another test instruction, later in the test stream, generates unpredictable data in that data area again. In an embodiment where test stream generator 110 loads all of the unpredictable data areas associated with the test instruction that generated unpredictable data with pre-defined, predictable data, test stream generator 110 also removes the address of the test instruction from unpredictable test instruction address pool 112. In an embodiment, test stream generator 110 subsequently returns to step 202 to process additional test instructions in the test stream and determine if the insertion of pre-requisite instructions is necessary to clean up unpredictable results.

Figure 3A:
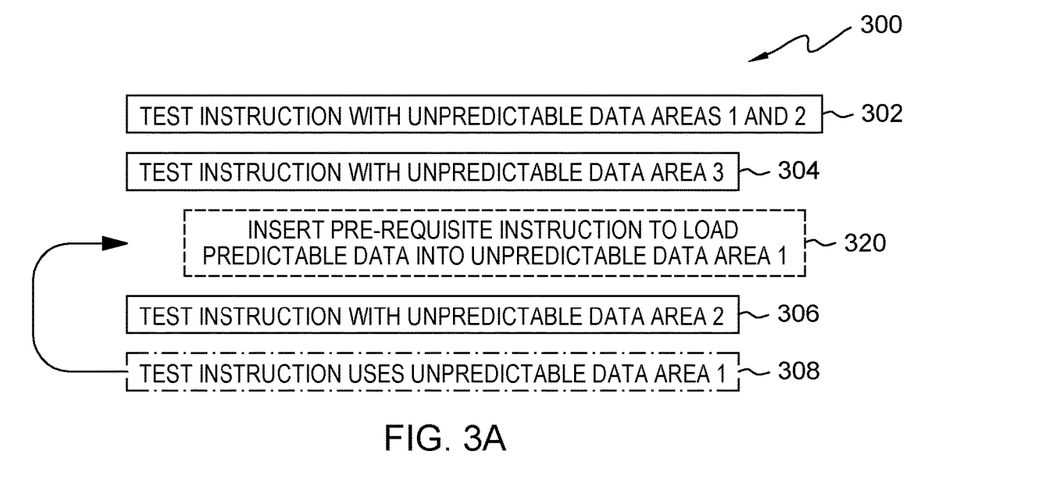
FIG. 3A illustrates an example of the operation of the test stream generator, on the server computer within the distributed data processing environment of FIG. 1, in accordance with an embodiment of the present invention.
Figure 3B:
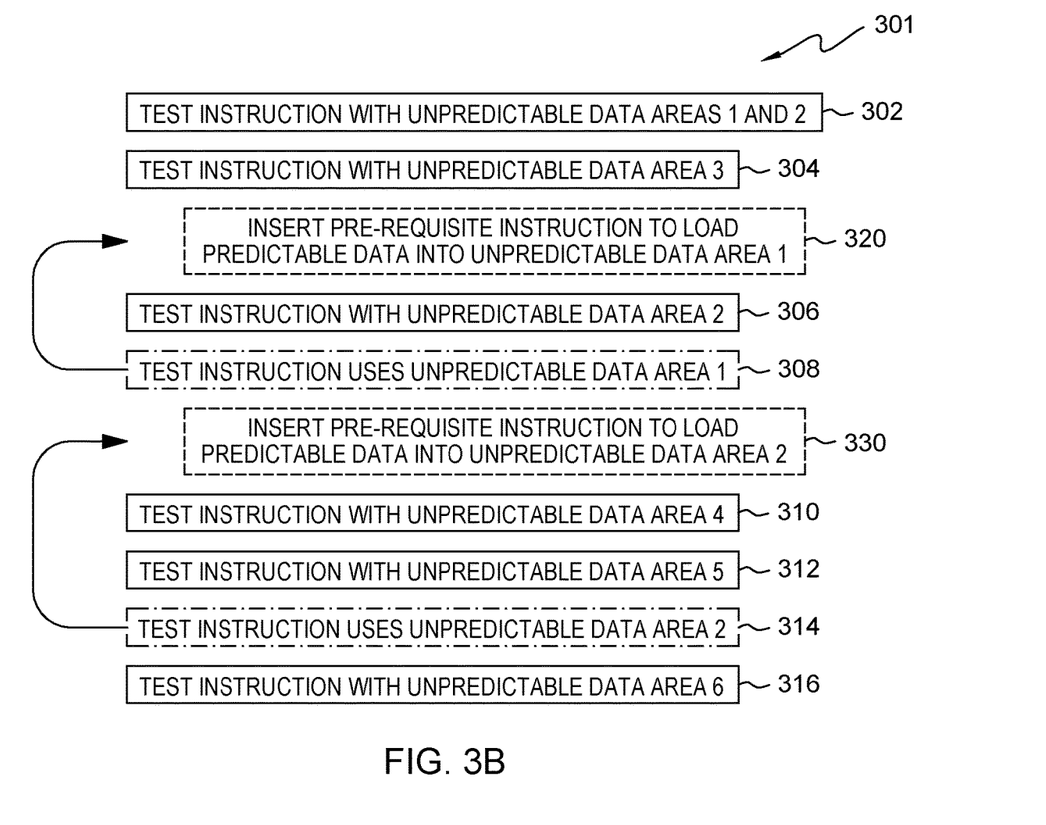
FIG. 3B illustrates an example of the operation of the test stream generator, on the server computer within the distributed data processing environment of FIG. 1, in accordance with an embodiment of the present invention.

FIG. 3A and FIG. 3B illustrate examples of the operation of test stream generator 110, on server computer 108 within distributed data processing environment 100 of FIG. 1, in accordance with an embodiment of the present invention.

FIG. 3A depicts example test stream scenario 300 where only one test instruction generates an unpredictable data area used by a subsequent test instruction. Test instruction 302, test instruction 304, and test instruction 306 each generate unpredictable data in associated unpredictable data areas. Test instruction 302 generates unpredictable data in unpredictable data area 1 and in unpredictable data area 2. Test instruction 304 generates unpredictable data in unpredictable data area 3. Test instruction 306 generates unpredictable data in unpredictable data area 2. In the depicted scenario, one test instruction, i.e., test instruction 308, subsequently uses data from an unpredictable data area, i.e., unpredictable data area 1. Test stream generator 110 performs a backward search, in, for example, unpredictable data area pool 114, to determine the last test instruction that generates unpredictable data and is associated with unpredictable data area 1, i.e., an overlapped unpredictable data area. The backward search, starting from test instruction 308, indicates that test instruction 302 is the last test instruction, i.e., the most recent test instruction in the test stream, to generate unpredictable data in unpredictable data area 1. Test stream generator 110 can insert pre-requisite instructions to clean up unpredictable data area 1 anywhere in the test stream between test instruction 302 and test instruction 308. In the example, test stream generator 110 inserts pre-requisite instruction 320 between test instruction 304 and test instruction 306. Pre-requisite instruction 320 loads predictable data into unpredictable data area 1 such that when test instruction 308 accesses unpredictable data area 1, test instruction 308 uses predictable data.

Note that in the depicted scenario, test stream generator 110 could perform a forward search with no additional overhead because there is only one test instruction in the test stream that generates overlapped unpredictable data.

FIG. 3B depicts example test stream scenario 301 where multiple test instructions generate the same unpredictable data area used by a subsequent test instruction. FIG. 3B includes all the test instructions depicted in FIG. 3A. FIG. 3B also includes test instruction 310, which generates unpredictable data in data area 4, test instruction 312, which generates unpredictable data in unpredictable data area 5, and test instruction 316, which generates unpredictable data in unpredictable data area 6. In the depicted scenario, in addition to test instruction 308, test instruction 314 also subsequently uses data from an unpredictable data area, i.e., unpredictable data area 2. Both test instruction 302 and test instruction 306 generate unpredictable data in unpredictable data area 2. Upon generating test instruction 314, test stream generator 110 performs a backward search to determine the last test instruction that generates unpredictable data and is associated with unpredictable data area 2. The backward search, starting from test instruction 314, indicates that test instruction 306 is the last test instruction, i.e., the most recent test instruction, to generate unpredictable data in an overlapped data area, i.e., unpredictable data area 2. Test stream generator 110 can insert pre-requisite instructions to clean up unpredictable data area 2 anywhere in the test stream between test instruction 306 and test instruction 314. In the example, test stream generator 110 inserts pre-requisite instruction 330 between test instruction 308 and test instruction 310. Pre-requisite instruction 330 loads predictable data into unpredictable data area 2 such that when test instruction 314 accesses unpredictable data area 2, test instruction 314 uses predictable data. Thus, test instructions with one or more unpredictable data areas and subsequent test instructions that use at least a portion of the one or more unpredictable data areas can be interleaved.

Note that in the scenario depicted in FIG. 3B, if test stream generator 110 inserted pre-requisite instruction 330 to clean up unpredictable data area 2 between test instruction 302 and test instruction 306, then test instruction 306 would store unpredictable data in unpredictable data area 2 after cleanup, and replace the pre-defined, predictable data that was loaded by pre-requisite instruction 330 with unpredictable data. Subsequently, test instruction 314 would use unpredictable data instead of predictable data. Thus, the random placement of the pre-requisite instruction between the current test instruction and the last test instruction to generate unpredictable data in the overlapped unpredictable data area prevents errors due to the current test instruction using unpredictable data, in addition to preventing a pattern of pre-requisite instruction insertion.

Also, in the scenario depicted in FIG. 3B, if test stream generator 110 performed a forward search, starting at test instruction 302, to find the last test instruction to generate unpredictable data in unpredictable data area 2 before test instruction 314, then test stream generator 110 would have to keep track of each positive search result, ignoring a previous positive result if a subsequent positive result is found, in order to find the last test instruction that generates unpredictable data in an overlapped data area. For example, in a forward search, starting with test instruction 302, test stream generator 110 would note that test instruction 302 generates unpredictable data in unpredictable data area 2. Subsequently, test stream generator 110 would note that test instruction 306 generates unpredictable data in unpredictable data area 2, and therefore ignore the previously noted test instruction. Thus, the backward search is more efficient than the forward search because it requires less code and logic, as well as no record keeping, to find the last test instruction that stored unpredictable data in an overlapped unpredictable data.

Figure 4:
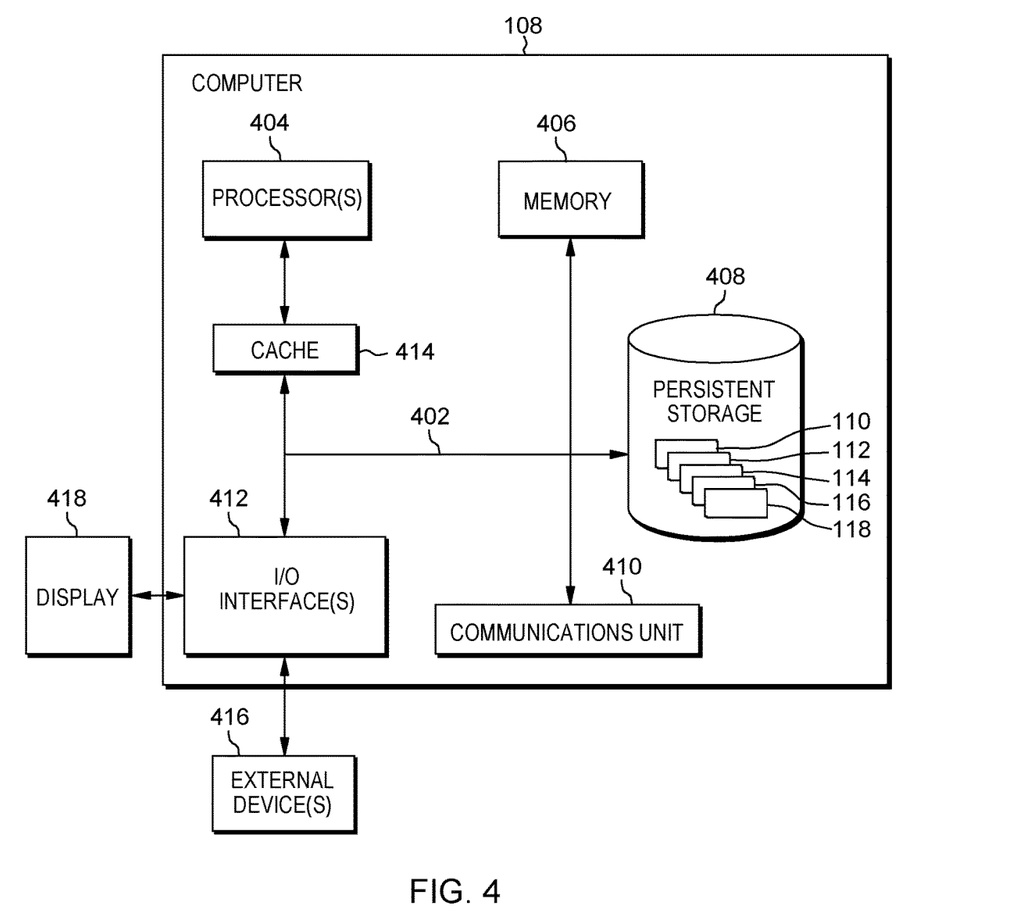
FIG. 4 depicts a block diagram of components of the server computer executing the test stream generator within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., test stream generator 110, unpredictable test instruction address pool 112, unpredictable data area pool 114, predictable data library 116, and machine storage 118, can be stored in persistent storage 408 for execution and/or access by one or more of the respective processor(s) 404 of server computer 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Test stream generator 110, unpredictable test instruction address pool 112, unpredictable data area pool 114, predictable data library 116, and machine storage 118 may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., test stream generator 110, unpredictable test instruction address pool 112, unpredictable data area pool 114, predictable data library 116, and machine storage 118 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for cleanup of unpredictable test results, the computer program product comprising:
one or more computer readable storage devices and program instructions stored on the one or more computer readable storage devices, the stored program instructions comprising:
program instructions to generate a data area associated with a test instruction in a test stream;
program instructions to determine whether the data area overlaps with an unpredictable data area;
responsive to determining the data area overlaps with the unpredictable data area, program instructions to determine a prior test instruction associated with the unpredictable data area, wherein the prior test instruction precedes the test instruction in the test stream;
program instructions to select a location in the test stream between the test instruction and the prior test instruction; and
program instructions to insert one or more pre-requisite instructions in the location, wherein the one or more pre-requisite instructions load the unpredictable data area with pre-defined data.

2. The computer program product of claim 1, the stored program instructions further comprising:
responsive to generating the data area associated with the test instruction, program instructions to determine whether the test instruction generates predictable data;
responsive to determining the test instruction does not generate predictable data, program instructions to store an address of the test instruction in a first database;
program instructions to store an address of the data area associated with the test instruction in a second database; and
program instructions to store a length of the data area associated with the test instruction in the second database.

3. The computer program product of claim 2, the stored program instructions further comprising:
responsive to inserting the one or more pre-requisite instructions in the location, program instructions to remove the address of the test instruction from the first database;
program instructions to remove the address of the data area associated with the test instruction from the second database; and
program instructions to remove the length of the data area associated with the test instruction from the second database.

4. The computer program product of claim 1, the stored program instructions further comprising, responsive to determining the prior test instruction associated with the unpredictable data area, program instructions to determine whether the test instruction can use one or more data areas containing predictable data.

5. The computer program product of claim 1, wherein the location is a random location between the test instruction and the prior test instruction.

6. The computer program product of claim 1, wherein the pre-defined data is predictable data, and wherein the pre-defined data is stored in a read-only database.

7. The computer program product of claim 1, wherein the one or more pre-requisite instructions further comprise:
program instructions to copy the pre-defined data; and
program instructions to overwrite data in the unpredictable data area with the pre-defined data.

8. A computer system for cleanup of unpredictable test results, the computer system comprising:
one or more computer processors;
one or more computer readable storage devices;
program instructions stored on the one or more computer readable storage devices for execution by at least one of the one or more computer processors, the stored program instructions comprising:
program instructions to program instructions to generate a data area associated with a test instruction in a test stream;
program instructions to determine whether the data area overlaps with an unpredictable data area;
responsive to determining the data area overlaps with the unpredictable data area, program instructions to determine a prior test instruction associated with the unpredictable data area, wherein the prior test instruction precedes the test instruction in the test stream;
program instructions to select a location in the test stream between the test instruction and the prior test instruction; and
program instructions to insert one or more pre-requisite instructions in the location, wherein the one or more pre-requisite instructions load the unpredictable data area with pre-defined data.

9. The computer system of claim 8, the stored program instructions further comprising:
responsive to generating the data area associated with the test instruction, program instructions to determine whether the test instruction generates predictable data;
responsive to determining the test instruction does not generate predictable data, program instructions to store an address of the test instruction in a first database;
program instructions to store an address of the data area associated with the test instruction in a second database; and
program instructions to store a length of the data area associated with the test instruction in the second database.

10. The computer system of claim 9, the stored program instructions further comprising:
responsive to inserting the one or more pre-requisite instructions in the location, program instructions to remove the address of the test instruction from the first database;
program instructions to remove the address of the data area associated with the test instruction from the second database; and
program instructions to remove the length of the data area associated with the test instruction from the second database.

11. The computer system of claim 8, the stored program instructions further comprising, responsive to determining the prior test instruction associated with the unpredictable data area, program instructions to determine whether the test instruction can use one or more data areas containing predictable data.

12. The computer system of claim 8, wherein the location is a random location between the test instruction and the prior test instruction.

13. The computer system of claim 8, wherein the one or more pre-requisite instructions further comprise:
  program instructions to copy the pre-defined data; and
  program instructions to overwrite data in the unpredictable data area with the pre-defined data.

* * * * *